United States Patent
Usugi et al.

(10) Patent No.: US 8,552,138 B2
(45) Date of Patent: Oct. 8, 2013

(54) POLYESTER RESIN, PRODUCTION PROCESS THEREFOR AND USE THEREOF

(75) Inventors: Shinichi Usugi, Chiba (JP); Ryohei Ogawa, Ichihara (JP); Hideshi Hori, Kawasaki (JP); Akifumi Kagayama, Chiba (JP)

(73) Assignee: Mitsui Chemicals, Inc., Tokyo (JP)

( * ) Notice: Subject to any disclaimer, the term of this patent is extended or adjusted under 35 U.S.C. 154(b) by 0 days.

(21) Appl. No.: 12/920,804

(22) PCT Filed: Mar. 3, 2009

(86) PCT No.: PCT/JP2009/053973
§ 371 (c)(1), (2), (4) Date: Sep. 2, 2010

(87) PCT Pub. No.: WO2009/110472
PCT Pub. Date: Sep. 11, 2009

(65) Prior Publication Data
US 2011/0040065 A1    Feb. 17, 2011

(30) Foreign Application Priority Data
Mar. 4, 2008   (JP) .................................. 2008-053622

(51) Int. Cl.
*C08G 18/22* (2006.01)
*C08G 18/10* (2006.01)

(52) U.S. Cl.
USPC ................................. 528/56; 528/57; 528/59

(58) Field of Classification Search
None
See application file for complete search history.

(56) References Cited

U.S. PATENT DOCUMENTS

| | | | |
|---|---|---|---|
| 6,037,384 A * | 3/2000 | Kakizawa et al. | 521/182 |
| 6,255,403 B1 * | 7/2001 | Andrist et al. | 525/326.1 |
| 2002/0006973 A1 * | 1/2002 | Itoh et al. | 521/48 |
| 2005/0154148 A1 * | 7/2005 | Nakamichi et al. | 525/450 |
| 2006/0147412 A1 | 7/2006 | Hossainy et al. | |
| 2010/0029860 A1 | 2/2010 | Honma et al. | |

FOREIGN PATENT DOCUMENTS

| | | |
|---|---|---|
| JP | 05-148352 | 6/1993 |
| JP | 07-228656 A | 8/1995 |
| JP | 08-120073 | 5/1996 |
| JP | 08-193119 A | 7/1996 |
| JP | 11-302374 A | 11/1999 |
| JP | 2002-155197 | 5/2002 |

(Continued)

OTHER PUBLICATIONS

Tuominen, Jukka "Chain Linked Lactic Acid Polymers: Polymerization and Biodegradation Studies" Polymer Technology Publication Series, 2003, No. 25, pp. 1-54.*
International Seach Report in PCT/JP2009/053973 dated Jun. 9, 2009.

(Continued)

*Primary Examiner* — Randy Gulakowski
*Assistant Examiner* — Jeffrey Washville
(74) *Attorney, Agent, or Firm* — Foley & Lardner LLP

(57) ABSTRACT

Polyester resins (C) of the invention have a practically sufficient high molecular weight and a high crystallinity and have an amide group in the molecular chain. Processes for producing the polyester resins are also disclosed. In detail, the polyester resins (C) have a practically sufficient high molecular weight and a high crystallinity and have a biodegradable amide group in the molecular chain. Processes for producing the polyester resins are also disclosed.
The polyester resins (C) are obtained by reacting an aliphatic polyester resin (A) and a polyisocyanate compound (B) in the presence of an amidation catalyst and contain a specific structural unit.

22 Claims, 1 Drawing Sheet

(56) References Cited

FOREIGN PATENT DOCUMENTS

| | | |
|---|---|---|
| JP | 2004-285121 | 10/2004 |
| JP | 2006-037055 A | 2/2006 |
| JP | 2006-152196 | 6/2006 |
| JP | 2007-515543 A | 6/2007 |
| JP | 2008-527074 A | 7/2008 |
| WO | WO-2005/063881 A1 | 7/2005 |
| WO | WO-2008/102576 A1 | 8/2008 |

OTHER PUBLICATIONS

Korean Office Action in Korean Application No. 10-2010-7022025 dated May 16, 2012.

Gurtler, C. et al. "A catalyst system for the reaction of carboxylic acids with aliphatic isocyanates", Tetrahedron Letters, 2004, vol. 45, pp. 2515-2521.

Office Action Japanese Patent Application No. 2010-501919 dated Jun. 18, 2013.

* cited by examiner

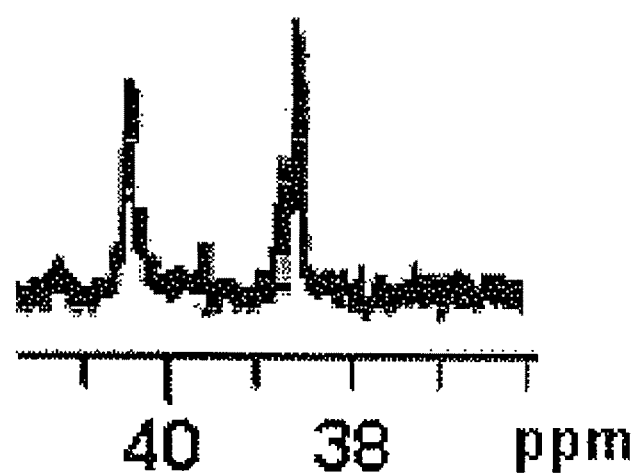

POLYESTER RESIN, PRODUCTION PROCESS THEREFOR AND USE THEREOF

FIELD OF THE INVENTION

The present invention relates to polyester resins, production processes therefor and uses thereof.

BACKGROUND OF THE INVENTION

Aliphatic polyesters, particularly those obtained from hydroxycarboxylic acids, such as polylactic acids, polyglycolic acids and copolymers containing these polymers, attract attention as biodegradable polymer compounds. The biodegradable polymer compounds are used in various materials such as medical materials including sutures and sustained-release materials such as drugs, agricultural chemicals and fertilizers.

For use in such fields, the polymer compounds generally require high mechanical properties. Accordingly, the polymer compounds should have a high molecular weight. According to a conventional process for obtaining high-molecular weight polymers, lactide or glycolide is produced from lactic acid or glycolic acid and is ring-opening polymerized to give polylactide or polyglycolide having high molecular weight. Although the process affords high-molecular weight polymers, the two-step reaction entails great amounts of energy and is not economical. Direct polycondensation of lactic acid or glycolic acid is economically efficient but does not produce high-molecular weight polymers.

Patent Document 1 discloses a process in which polylactic acid of low molecular weight obtained by direct polycondensation is reacted with diisocyanate and thereby the molecular chains are extended. However, the process requires that the reaction with diisocyanate is performed at or above the melting point of the polylactic acid, for example at 210 to 215° C., and therefore the reaction is very difficult to control and has often resulted in evaporation of diisocyanate or undesired side reactions. Further, the process is only capable of extending the molecular chains to approximately twice the molecular weight of the low-molecular weight polylactic acid. It has been thus difficult to increase the molecular weight to more than twice that of low-molecular weight polymers.

Non-patent Document 1 describes a process for polymerizing low-molecular weight polylactic acid to more than twice the molecular weight thereof. According to this process, diol-terminated (i.e., at both ends) telechelic polylactic acid is reacted with diisocyanate, and the newly formed bonds are all thermally labile urethane bonds.

In addition to the above process, Non-patent Document 1 further discloses a process in which dicarboxylic acid-terminated (i.e., at both ends) telechelic polylactic acid having low molecular weight is reacted with a bisoxazoline compound. However, the bisoxazoline compounds are expensive and the process is not suited for industrial use.

Patent Documents 2 and 3 and Non-patent Document 1 describe other processes for producing polylactic acid resins having high molecular weight. However, these processes involve reactions at high temperatures and have similar problems as described above. Furthermore, the obtainable polylactic acid resins often have problems such as low crystallinity or coloration.

[Patent Document 1] JP-A-H05-148352
[Patent Document 2] JP-A-2002-155197
[Patent Document 3] JP-A-2004-285121
[Non-patent Document 1] Jukka Tuominen, CHAIN LINKED LACTIC ACID POLYMERS, POLYMERIZATION AND BIODEGRADATION STUDIES, Polymer Technology Publication Series Espoo 2003, Finland, Helsinki University of Technology, 2003, 2.28, No. 25

It is an object of the present invention to provide high-molecular weight and high-crystallinity polyester resins having an amide bond in the molecular chain, and production processes therefor and uses of the polyester resins. In more detail, it is an object of the invention to provide biodegradable polyester resins having an amide bond in the molecular chain, and production processes therefor and uses of the polyester resins.

The present inventors studied diligently to achieve the above object. They have then found that a polyester resin (C) having an amide bond in the molecular chain that is obtained through a specific reaction step possesses high molecular weight and high crystallinity. They have further found that the specific reaction step allows for inexpensive production of biodegradable polyester resins (C) having high molecular weight and excellent heat stability. The present invention has been completed based on the findings.

A polyester resin (C) according to the present invention is obtained by reacting an aliphatic polyester resin (A) and a polyisocyanate compound (B) in the presence of an amidation catalyst and comprises a structural unit represented by Formula (1) below:

[Chem. 1]

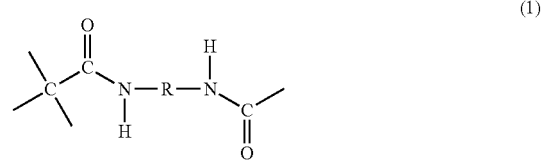

wherein R is a C1-20 aliphatic hydrocarbon group, an alicyclic structure-containing hydrocarbon group or an aromatic ring-containing hydrocarbon group.

The aliphatic polyester resin (A) is preferably obtained from a hydroxycarboxylic acid and is more preferably polylactic acid. The polylactic acid is preferably obtained from lactic acid, and the content of L-isomer or D-isomer in the lactic acid is preferably not less than 90%.

The polyester resin (C) preferably has a crystallinity in the range of 10 to 70% and a weight average molecular weight in the range of 100,000 to 1,000,000.

The polyisocyanate compound (B) is preferably an aliphatic diisocyanate compound and is more preferably a compound selected from the group consisting of hexamethylene diisocyanate, isophorone diisocyanate, 1,3-(bis-isocyanatomethyl)cyclohexane, bis(isocyanatomethyl)bicyclo-[2,2,1]-heptane and bis(4-isocyanatocyclohexyl)methane.

The polyester resin (C) of the invention may comprise in a major proportion a structural unit represented by at least one selected from Formulae (2) to (4) below:

As used herein, the words "in a major proportion" mean that the resin contains the structural units represented by at least one selected from Formulae (2) to (4) below in a proportion of not less than 60 wt %, and more preferably not less than 90 wt %.

[Chem. 2]

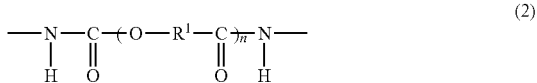
(2)

wherein R¹ each independently represent a substituted or unsubstituted C1-20 aliphatic hydrocarbon group and n is an integer ranging from 20 to 1500;

[Chem. 3]

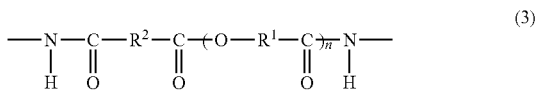
(3)

wherein R¹ each independently represent a substituted or unsubstituted C1-20 aliphatic hydrocarbon group, R² represents a substituted or unsubstituted C1-20 aliphatic hydrocarbon group, a C2-20 unsaturated hydrocarbon group or an aromatic hydrocarbon group, and n is an integer ranging from 20 to 1500;

[Chem. 4]

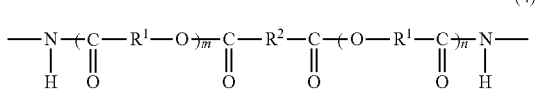
(4)

wherein R¹ each independently represent a substituted or unsubstituted C1-20 aliphatic hydrocarbon group, R² represents a substituted or unsubstituted C1-20 aliphatic hydrocarbon group, a C2-20 unsaturated hydrocarbon group or an aromatic hydrocarbon group, and n and m are each independently an integer ranging from 20 to 1500.

In a preferred embodiment, the weight average molecular weight of the aliphatic polyester resin (A) is in the range of 5,000 to 100,000 and that of the polyester resin (C) obtained is in the range of 100,000 to 1,000,000 and is 3 to 200 times larger than the weight average molecular weight of the aliphatic polyester resin (A).

A process for producing the polyester resin (C) according to the invention comprises a step of reacting an aliphatic polyester resin (A) and a polyisocyanate compound (B) in the presence of an amidation catalyst.

The polyisocyanate compound (B) is preferably a diisocyanate compound.

The aliphatic polyester resin (A) is preferably an aliphatic polyester resin in which a terminal hydroxyl group has been converted to a carboxyl group.

In a preferred embodiment, the polyisocyanate compound (B) is added in a molar amount that is 0.8 to 2.0 times the moles of the aliphatic polyester resin (A).

The aliphatic polyester resin (A) preferably has a weight average molecular weight in the range of 5,000 to 100,000.

The aliphatic polyester resin (A) preferably has a Sn content of not more than 300 ppm.

The amidation catalyst preferably contains at least one metal selected from the Group I, II and III metals of the periodic table and more preferably contains magnesium or calcium.

In the process for producing the polyester resin (C), the reaction is preferably carried out in a twin-screw extruder.

A film according to the invention comprises the polyester resin (C).

A shaped article according to the invention comprises the polyester resin (C).

ADVANTAGEOUS EFFECTS OF THE INVENTION

The polyester resins (C) of the invention have an amide bond in the molecular chain and possess practically sufficient molecular weight and high crystallinity. The polyester resins are therefore suitably used in fields requiring biodegradability such as films.

BRIEF DESCRIPTION OF THE DRAWING

FIG. 1 shows a $^{13}$C-NMR spectrum of a resin obtained in Example 1.

PREFERRED EMBODIMENTS FOR CARRYING OUT THE INVENTION

Polyester resins (C) according to the present invention are obtained by reacting an aliphatic polyester resin (A) and a polyisocyanate compound (B) in the presence of an amidation catalyst, and contain a structural unit represented by Formula (1) below. The polyisocyanate compound (B) is preferably a diisocyanate compound.

[Chem. 5]

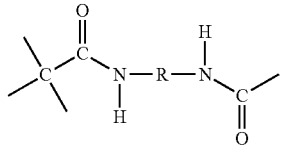
(1)

In Formula (1), R is a C1-20 aliphatic hydrocarbon group, an alicyclic structure-containing hydrocarbon group or an aromatic ring-containing hydrocarbon group. Examples of the C1-20 aliphatic hydrocarbon groups include methylene, ethylene, propylene, methylethylene, butylene, 1-methylpropylene, 2-methylpropylene, 1,2-dimethylpropylene, 1,3-dimethylpropylene, 1-methylbutylene, 2-methylbutylene, 3-methylbutylene, 4-methylbutylene, 2,4-dimethylbutylene, 1,3-dimethylbutylene, pentylene, hexylene, heptylene, octylene, decylene, dodecylene, ethane-1,1-diyl, propane-2,2-diyl, tridecylene, tetradecylene, pentadecylene, hexadecylene, heptadecylene, octadecylene and nonadecylene. In these alkyl groups, any —CH$_2$— may be substituted with —O—, —CO—, —COO— or —SiH$_2$—. Examples of the alicyclic structure-containing hydrocarbon groups include cyclopropylene, 1,3-cyclobutylene, 1,3-cyclopentylene, 1,4-cyclohexylene, 1,5-cyclooctylene, norbornylene, 1,3-cyclopentylene, 1,2-cyclohexylene, 1,4-cyclohexylene, 1,4-dimethylcyclohexylene, 1,3-dimethylcyclohexylene, 1-methyl-2,4-cyclohexylene, 4,4'-methylene-bis-cyclohexylene and 3-methylene-3,5,5-trimethyl-cyclohexylene. Examples of the aromatic ring-containing hydrocarbon groups include m-phenylene, p-phenylene, 4,4'-diphenylene, 1,4-naphthalene, 1,5-naphthalene, 4,4'-methylenediphenylene, 2,4-tolylene, 2,6-tolylene, m-xylylene, p-xylylene, m-tetramethylxylylene, 4,4'-oxydiphenylene and chlorodiphenylene.

The polyester resins (C) contain 1 to 200 structural units, preferably 1 to 100 units, and more preferably 1 to 50 units represented by Formula (1) per molecule.

The polyester resins (C) preferably have a crystallinity in the range of 10 to 70%, more preferably 10 to 60%, and still more preferably 10 to 50%.

The crystallinity in the invention may be measured by a method as will be described later in the working examples.

The polyester resins (C) preferably have a weight average molecular weight in the range of 100,000 to 1,000,000, more preferably 100,000 to 700,000, and still more preferably 100,000 to 500,000. The polyester resins (C) having this weight average molecular weight show excellent shaping properties and mechanical strength.

Processes for producing the polyester resin (C) include a step of reacting an aliphatic polyester resin (A) and a polyisocyanate compound (B) in the presence of an amidation catalyst. The polyisocyanate compound (B) is preferably a diisocyanate compound.

The aliphatic polyester resins (A) are not particularly limited as long as the objects of the invention are accomplished. Examples thereof include polylactic acid, polyglycolic acid, poly(3-hydroxybutyric acid), poly(4-hydroxybutyric acid), poly(2-hydroxy-n-butyric acid), poly(2-hydroxy-3,3-dimethylbutyric acid), poly(2-hydroxy-3-methylbutyric acid), poly(2-methyllactic acid), poly(2-hydroxyvaleric acid), poly(2-hydroxycaproic acid), poly(2-hydroxylauric acid), poly(2-hydroxymyristic acid), poly(2-hydroxypalmitic acid), poly(2-hydroxystearic acid), polymalic acid, polycitric acid, polytartaric acid, poly(2-hydroxy-3-methylbutyric acid), poly(2-cyclohexyl-2-hydroxyacetic acid), polymandelic acid, polysalicylic acid; polylactones such as polybutyrolactone, polycaprolactone, polyvalerolactone, polymethylvalerolactone and polyethylvalerolactone; and aliphatic polyester resins formed between diols and dicarboxylic acids, such as polyethylene succinate, polyethylene adipate, polyethylene sebacate, poly(diethylene succinate), poly(diethylene adipate), poly(diethylene sebacate), polybutylene succinate, polybutylene adipate and polybutylene sebacate. Of these, polylactic acid, polyglycolic acid, poly(3-hydroxybutyric acid), poly(4-hydroxybutyric acid) and poly(2-hydroxy-n-butyric acid) are preferred.

Existing aliphatic polyester resins may be used. Aliphatic polyester resins obtained from hydroxycarboxylic acids are preferable. For example, the aliphatic polyester resins (A) may be obtained from hydroxycarboxylic acids by the following two exemplary methods. One is a direct method in which a hydroxycarboxylic acid is directly dehydrated and condensed. In the other method, a cyclic dimer is synthesized from a hydroxycarboxylic acid and the dimer is ring-opening polymerized.

In detail, a starting material hydroxycarboxylic acid is heated in an inert gas atmosphere, then polycondensed at a reduced pressure, and finally polycondensed at predetermined temperature and pressure to give an aliphatic polyester resin (A). The polycondensation reaction may be carried out in the presence of a catalyst.

Examples of the catalysts include the Group II, XII, XIII, XIV and XV metals of the periodic table, oxides thereof and salts thereof. Specific examples include metals such as zinc powder, tin powder, aluminum and magnesium; metal oxides such as antimony oxide, zinc oxide, tin oxide, aluminum oxide, magnesium oxide and titanium oxide; metal halides such as stannous chloride, stannic chloride, stannous bromide, stannic bromide, antimony fluoride, zinc chloride, magnesium chloride and aluminum chloride; carbonates such as magnesium carbonate and zinc carbonate; organic carboxylates such as tin acetate, tin octanoate, tin lactate, zinc acetate and aluminum acetate; and organic sulfonates such as tin trifluoromethanesulfonate, zinc trifluoromethanesulfonate, magnesium trifluoromethanesulfonate, tin methanesulfonate and tin p-toluenesulfonate. Examples further include organic metal oxides of the above metals such as dibutyltin oxide; metal alkoxides of the above metals such as titanium isopropoxide; alkyl metals of the above metals such as diethyl zinc; ion exchange resins such as DOWEX and AMBERLITE; and protonic acids such as sulfuric acid, methanesulfonic acid and p-toluenesulfonic acid. Metallic tin and zinc, and metallic compounds thereof provide high polymerization rate and high-molecular weight polymers. Metallic tin and tin compounds are particularly preferable.

The aliphatic polyester resin (A) obtained as described above may be subjected to the reaction step directly or after a terminal hydroxyl group of the resin (A) is converted to a carboxyl group. The terminal hydroxyl group of the resin (A) may be converted to the carboxyl group by the addition of acid anhydride. Examples of the acid anhydrides include succinic anhydride, phthalic anhydride, maleic anhydride, tetrabromophthalic anhydride, tetrahydrophthalic anhydride, trimellitic anhydride and dodecylsuccinic anhydride, with succinic anhydride being particularly preferable. The addition amount of the acid anhydrides may be in the range of 0.1 to 10 parts by weight, preferably 0.5 to 8 parts by weight, and more preferably 0.5 to 5 parts by weight based on 100 parts by mass of the aliphatic polyester resin (A) to be converted.

The aliphatic polyester resin (A) obtained by the methods as described above may be hydrolyzed before subjected to the reaction step.

(Hydroxycarboxylic Acids)

The hydroxycarboxylic acids are not particularly limited as long as the objects of the invention are accomplished. Examples thereof include lactic acid, glycolic acid, 3-hydroxybutyric acid, 4-hydroxybutyric acid, 2-hydroxy-n-butyric acid, 2-hydroxy-3,3-dimethylbutyric acid, 2-hydroxy-3-methylbutyric acid, 2-methyllactic acid, 2-hydroxyvaleric acid, 2-hydroxycaproic acid, 2-hydroxylauric acid, 2-hydroxymyristic acid, 2-hydroxypalmitic acid, 2-hydroxystearic acid, malic acid, citric acid, tartaric acid, 2-hydroxy-3-methylbutyric acid, 2-cyclohexyl-2-hydroxyacetic acid, mandelic acid, salicylic acid, ring-opened lactones such as ring-opened caprolactone, and mixtures of these acids. Of these, lactic acid, glycolic acid and aqueous solutions thereof are preferable because a particularly high polymerization rate is achieved by the use thereof and they are easily available. Lactic acid is particularly preferred. Lactic acid as the hydroxycarboxylic acid provides favorable operation properties. When lactic acid is used as the hydroxycarboxylic acid, the obtainable aliphatic polyester resin (A) is polylactic acid. Lactic acid has L-isomer and D-isomer. The content of L-isomer or D-isomer is preferably larger than the other isomer. In detail, the content of L-isomer or the content of D-isomer is preferably not less than 90%, more preferably not less than 95%, and particularly preferably not less than 98%. This content of L-isomer or D-isomer tends to ensure that the obtainable resin has high crystallinity.

(Aliphatic Polyester Resins (A))

Corresponding to the raw material hydroxycarboxylic acids, the aliphatic polyester resins (A) include polylactic acid, polyglycolic acid, poly(3-hydroxybutyric acid), poly(4-hydroxybutyric acid), poly(2-hydroxy-n-butyric acid), poly(2-hydroxy-3,3-dimethylbutyric acid), poly(2-hydroxy-3-methylbutyric acid), poly(2-methyllactic acid), poly(2-hydroxycaproic acid), poly(2-hydroxy-3-methylbutyric acid), poly(2-cyclohexyl-2-hydroxyacetic acid), poly(mandelic acid), polycaprolactone, copolymers of these polymers, and mixtures of these polymers.

The aliphatic polyester resins (A) preferably have a weight average molecular weight in the range of 5,000 to 100,000, more preferably 10,000 to 80,000, and particularly preferably 10,000 to 50,000. The aliphatic polyester resins (A) having this weight average molecular weight can be polymerized to the desired molecular weight in a short polymerization time, and the reaction step of the invention may be completed in a reduced time.

In the invention, the weight average molecular weight (hereinafter, also Mw) is measured by a method as will be described later in the working examples.

In the aliphatic polyester resins (A), the content of heavy metals originating from the catalysts is preferably not more than 300 ppm, more preferably not more than 100 ppm, and most preferably not more than 30 ppm. The lower limit of the content is not particularly limited. When the aliphatic polyester resin (A) has this content of heavy metals originating from the catalysts, the obtainable polyester resin (C) tends to have a high molecular weight.

The aliphatic polyester resins (A) preferably have a Sn content of not more than 300 ppm, more preferably not more than 100 ppm, and particularly preferably not more than 30 ppm. In particular, a polyester resin (C) having a high molecular weight is obtained by controlling the Sn content in this range. The lower limit of the Sn content is not particularly limited. When the aliphatic polyester resin (A) has this Sn content, the obtainable polyester resin (C) tends to have a high molecular weight. Known methods may be used to remove Sn contained in the aliphatic polyester resins (A). For example, the resins may be treated with hydrochloric acid/2-propanol. The contents of heavy metals such as Sn may be measured by the following method.

<Measurement Method>

A sample is wet digested with sulfuric acid and hydrogen peroxide. The digested product in a volume of 1 ml is diluted forty times with hydrochloric acid to give a test solution. The test solution is analyzed with an ICP emission spectrometer (ICPS-8100 manufactured by Shimadzu Corporation) to determine the contents of heavy metals such as Sn. In the determination of the contents of heavy metals such as Sn by this method, the detection limit is 4 ppm.

The production process of the invention includes a step of reacting the aliphatic polyester resin (A) and a polyisocyanate compound (B) in the presence of an amidation catalyst. Exemplary procedures for carrying out the step are described below but are not limited thereto as long as the objects of the invention are accomplished.

The aliphatic polyester resin (A) is mixed with a solvent, and the mixture is heated to a predetermined temperature at normal pressure in a nitrogen atmosphere. A catalyst is added to the mixture, and a polyisocyanate compound (B) is added and reacted at a predetermined temperature. The reaction product obtained is decarbonated to give a polyester resin (C). The polyisocyanate compound (B) is preferably a diisocyanate compound.

In the above step, the reaction temperature is preferably in the range of 40 to 180° C., more preferably 60 to 160° C., and particularly preferably 80 to 150° C. When the reaction in the step is carried out at a temperature in the above range, high reaction rate is achieved and gelation is unlikely. If the reaction temperature in the step exceeds the above upper limit, crosslinking reaction proceeds and gelation may often result. If the reaction temperature is below the lower limit, the reaction rate is low and the polymerization may take a long time.

The solvents used in the above step include aromatic hydrocarbons such as toluene, xylene, ethylbenzene, mesitylene and cumene; aliphatic hydrocarbons such as propane, hexane, heptane and cyclohexane; and halogenated hydrocarbons such as methylene chloride, chloroform, 1,2-dichloroethane and 1,2-dichlorobenzene.

(Polyisocyanate Compounds (B))

The polyisocyanate compounds used in the above step are not particularly limited as long as the compounds have two or more isocyanate groups and the objects of the invention are accomplished. Examples of the polyisocyanate compounds having three or more isocyanate groups include triisocyanates such as 1,6,11-undecane triisocyanate; and polyisocyanate-substituted compounds such as polyphenylmethane polyisocyanate. The polyisocyanate compound (B) is preferably a diisocyanate compound.

Examples of the diisocyanate compounds include 2,4-tolylene diisocyanate, 2,4-tolylene diisocyanate/2,6-tolylene diisocyanate mixture, diphenylmethane diisocyanate, 1,5-naphthylene diisocyanate, xylylene diisocyanate, hexamethylene diisocyanate, isophorone diisocyanate, 1,3-(bis-isocyanatomethyl)cyclohexane, 1,4-bis(isocyanatomethyl)cyclohexane, bis(isocyanatomethyl)bicyclo-[2,2,1]-heptane and bis(4-isocyanatocyclohexyl)methane. More preferred compounds are 1,3-xylylene diisocyanate, hexamethylene diisocyanate, isophorone diisocyanate, 1,3-(bis-isocyanatomethyl)cyclohexane, 1,4-bis(isocyanatomethyl)cyclohexane, bis(isocyanatomethyl)bicyclo-[2,2,1]-heptane and bis(4-isocyanatocyclohexyl)methane.

Of the above compounds, a compound is preferably selected from the group consisting of hexamethylene diisocyanate, isophorone diisocyanate, 1,3-(bis-isocyanatomethyl)cyclohexane, bis(isocyanatomethyl)bicyclo-[2,2,1]-heptane and bis(4-isocyanatocyclohexyl)methane. Aliphatic diisocyanate compounds are preferable, and hexamethylene diisocyanate is particularly preferable. When these compounds are used as the polyisocyanate compounds (B), excellent color tone is obtained.

The amount of the polyisocyanate compound (B) may be determined based on the number average molecular weight (hereinafter, also Mn) of the aliphatic polyester resin (A) calculated from the carboxylic acid value. The number average molecular weight of the aliphatic polyester resin (A) may be determined from the carboxylic acid value assuming that the molecule of the aliphatic polyester resin (A) has one or two carboxyl groups at the terminals. The carboxylic acid value may be determined by a method as will be described later in the working examples.

The polyisocyanate compound (B) is preferably added in a molar amount that is 0.8 to 2.0 times, more preferably 0.8 to 1.5 times, and particularly preferably 0.8 to 1.3 times the moles of the aliphatic polyester resin (A). As used herein, the words "times the moles" indicate a unit for a value calculated from "moles of subject substance/1 mole of reference substance".

If the amount of the polyisocyanate compound (B) is below the lower limit, the addition of the polyisocyanate compound (B) does not provide the expected effects and the obtainable polyester resin (C) will hardly achieve a high molecular weight. Any amounts in excess of the upper limit result in side reactions such as isocyanate crosslinking and may cause gelation of the polyester resin (C).

(Amidation Catalysts)

The amidation catalysts in the invention preferentially catalyze the reaction of the polyisocyanate compound (B) with the terminal carboxyl groups of the aliphatic polyester resin (A), thereby forming amide bonds.

The amidation catalyst used in the reaction step preferably contains at least one metal selected from the Group I, II and III metals of the periodic table. The amidation catalyst more preferably contains at least one metal selected from potassium, magnesium, calcium and ytterbium, and particularly preferably contains magnesium or calcium. These metals provide advantages in catalytic effects and color tone.

Examples of the amidation catalysts containing the Group I metals of the periodic table include organic metal compounds such as organic acid salts, metal alkoxides and metal complexes (such as acetyl acetonate) of lithium, sodium, potassium, rubidium and cesium; and inorganic metal compounds of these metals such as metal oxides, metal hydroxides, carbonates, phosphates, sulfates, nitrates, chlorides and fluorides. Examples of the amidation catalysts containing the Group II metals of the periodic table include organic metal compounds such as organic acid salts, metal alkoxides and metal complexes (such as acetyl acetonate) of beryllium, magnesium, calcium, strontium and barium; and inorganic metal compounds of these metals such as metal oxides, metal hydroxides, carbonates, phosphates, sulfates, nitrates, chlorides and fluorides. Examples of the amidation catalysts containing the Group III metals of the periodic table include organic metal compounds such as organic acid salts, metal alkoxides and metal complexes (such as acetyl acetonate) of scandium, ytterbium, yttrium and other rare earths; and inorganic metal compounds of these metals such as metal oxides, metal hydroxides, carbonates, phosphates, sulfates, nitrates, chlorides and fluorides. These metal compound catalysts may be used singly or in combination. Of the above metal compound catalysts, bis(acetylacetonato)magnesium, magnesium stearate, calcium stearate, magnesium chloride and ytterbium triflate are preferred, and magnesium compounds, in particular bis(acetylacetonato)magnesium and magnesium stearate, are more preferred. Two or more kinds of these catalysts may be used in combination.

The amount of the amidation catalysts is 0.01 to 2 parts by mass, preferably 0.01 to 1 part by mass, and more preferably 0.01 to 0.5 part by mass based on 100 parts by mass of the aliphatic polyester resin (A).

When one of the molecular ends of the aliphatic polyester resin (A) is the hydroxyl group, the hydroxyl group is reacted with the polyisocyanate compound (B) to form a urethane bond. The polyisocyanate compound (B) is preferably a diisocyanate compound.

Examples of the urethane-forming catalysts include dibutyltin dilaurate, dibutyltin dichloride, dibutyltin oxide, dibutyltin dibromide, dibutyltin dimaleate, dibutyltin diacetate, dibutyltin sulfide, tributyltin sulfide, tributyltin oxide, tributyltin acetate, triethyltin ethoxide, tributyltin ethoxide, dioctyltin oxide, tributyltin chloride, tributyltin trichloroacetate, tin 2-ethylhexanoate; titanium-containing catalysts such as dibutyltitanium dichloride, tetrabutyl titanate and butoxytitanium trichloride; lead-containing catalysts such as lead oleate, lead 2-ethylhexanoate, lead benzoate and lead naphthenate; iron-containing catalysts such as iron 2-ethylhexanoate and iron acetylacetonate; cobalt-containing catalysts such as cobalt benzoate and cobalt 2-ethylhexanoate; zinc-containing catalysts such as zinc naphthenate and zinc 2-ethylhexanoate; zirconium naphthenate, triethylamine, triethylenediamine, N,N-dimethylbenzylamine, N-methylmorpholine and diazabicycloundecene (DBU). The amount of the urethane-forming catalysts is 0.01 to 2 parts by mass, preferably 0.01 to 1 part by mass, and more preferably 0.01 to 0.5 part by mass based on 100 parts by mass of the aliphatic polyester resin (A).

In the invention, the aliphatic polyester resin (A) and the polyisocyanate compound (B) are reacted together in the presence of the amidation catalyst to give a polyester resin (C). In this reaction step, the viscosity is drastically increased with increasing molecular weight of the reaction product. Accordingly, the reaction maybe suitably carried out in a solvent with stirring as described hereinabove. Alternatively, the materials maybe kneaded and reacted together in an extruder, in particular a twin-screw kneading extruder, without a solvent, and the reaction product may be extruded from the extruder. According to this embodiment, solvents are not required and the post treatment of the product is simple.

The polyester resin (C) of the invention may contain in a major proportion a structural unit represented by at least one selected from Formulae (2) to (4) below. Such polyester resins have biodegradability.

As used herein, the words "in a major proportion" mean that the resin contains the structural units represented by at least one selected from Formulae (2) to (4) below in a proportion of not less than 60 wt %, and more preferably not less than 90 wt %.

[Chem. 6]

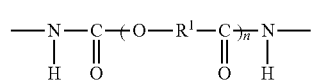

(2)

In Formula (2), $R^1$ each independently represent a substituted or unsubstituted C1-20 aliphatic hydrocarbon group and n is an integer ranging from 20 to 1500, preferably 25 to 1500, and more preferably 30 to 1500. The substituted or unsubstituted C1-20 aliphatic hydrocarbon groups are residues of the aliphatic polyester resins (A), such as ethylidene and propylidene.

[Chem. 7]

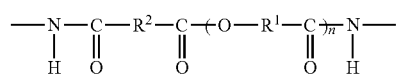

(3)

In Formula (3), $R^1$ each independently represent a substituted or unsubstituted C1-20 aliphatic hydrocarbon group, $R^2$ represents a substituted or unsubstituted C1-20 aliphatic hydrocarbon group, a C2-20 unsaturated hydrocarbon group or an aromatic hydrocarbon group, and n is an integer ranging from 20 to 1500, preferably 25 to 1500, and more preferably 30 to 1500. The substituted or unsubstituted C1-20 aliphatic hydrocarbon groups are residues of the aforementioned acid anhydrides, such as ethylene. The C2-20 unsaturated hydrocarbon groups are residues of the aforementioned acid anhydrides, such as vinylene. The aromatic hydrocarbon groups are residues of the aforementioned acid anhydrides, such as 1,2-phenylene.

[Chem. 8]

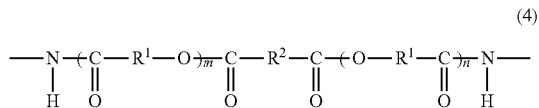

(4)

In Formula (4), $R^1$ each independently represent a substituted or unsubstituted C1-20 aliphatic hydrocarbon group, $R^2$ represents a substituted or unsubstituted C1-20 aliphatic hydrocarbon group, a C2-20 unsaturated hydrocarbon group or an aromatic hydrocarbon group, and n and m are each independently an integer ranging from 20 to 1500, preferably 25 to 1500, and more preferably 30 to 1500. The substituted or unsubstituted C1-20 aliphatic hydrocarbon groups are residues of the aforementioned acid anhydrides, such as ethylene. The C2-20 unsaturated hydrocarbon groups are residues of the aforementioned acid anhydrides, such as vinylene. The aromatic hydrocarbon groups are residues of the aforementioned acid anhydrides, such as 1,2-phenylene.

The polyester resin (C) which contains in a major proportion a structural unit represented by at least one selected from Formulae (2) to (4) above may be produced by, for example, reacting the aliphatic polyester resin (A) and/or the aliphatic polyester resin (A) in which a terminal hydroxyl group has been converted to a carboxylic acid group, with the polyisocyanate compound (B) in the presence of the amidation catalyst in a manner as described hereinabove. The amidation catalysts enable the amidation reaction to proceed under mild conditions and inhibit side reactions, affording the target polyester resin (C) with high purity.

In a preferred embodiment, the weight average molecular weight of the aliphatic polyester resin (A) and the aliphatic polyester resin (A) in which a terminal hydroxyl group has been converted to a carboxylic acid group, is in the range of 5,000 to 100,000, and more preferably 10,000 to 50,000. The weight average molecular weight in this range is preferable from the viewpoints of biodegradability, thermal properties and reaction step time.

The polyester resin (C) which contains in a major proportion a structural unit represented by at least one selected from Formulae (2) to (4) preferably has a weight average molecular weight in the range of 100,000 to 1,000,000, more preferably 100,000 to 700,000, and still more preferably 100,000 to 500,000. This weight average molecular weight ensures that the polyester resin (C) shows excellent shaping properties and mechanical strength. In a preferred embodiment, the weight average molecular weight of the polyester resin (C) is in the above range and is 3 to 200 times, more preferably 4 to 100 times, and particularly preferably 5 to 50 times larger than the weight average molecular weight of the aliphatic polyester resin (A). The weight average molecular weight in this range is sufficiently high and the polyester resin (C) achieves excellent properties such as mechanical properties.

In the aliphatic polyester resins (A) and the aliphatic polyester resins (A) in which a terminal hydroxyl group has been converted to a carboxylic acid group, the Sn content is preferably not more than 300 ppm, more preferably not more than 100 ppm, and particularly preferably not more than 30 ppm. In particular, a polyester resin (C) having a high molecular weight is obtained by controlling the Sn content in this range. The lower limit of the Sn content is not particularly limited. When the aliphatic polyester resins (A) and the aliphatic polyester resins (A) in which a terminal hydroxyl group has been converted to a carboxylic acid group have this Sn content, the obtainable polyester resins (C) tend to have a high molecular weight. Known methods may be used to remove Sn contained in the aliphatic polyester resins (A) and the aliphatic polyester resins (A) in which a terminal hydroxyl group has been converted to a carboxylic acid group. For example, the resins may be treated with hydrochloric acid/2-propanol. The content of heavy metals such as Sn may be measured by the method described hereinabove.

The polyester resin (C) which contains in a major proportion a structural unit represented by at least one selected from Formulae (2) to (4) preferably has a crystallinity in the range of 10 to 70%, more preferably 10 to 60%, and still more preferably 10 to 50%.

The polyester resins (C) which contain in a major proportion a structural unit represented by at least one selected from Formulae (2) to (4) are biodegradable because of the biodegradability of the amide bonds and the units represented by Formula (a) below:

[Chem. 9]

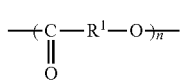

(a)

The following scheme shows an exemplary process for producing a polyester resin which contains the structural unit of Formula (2) in a major proportion.

[Chem. 10]

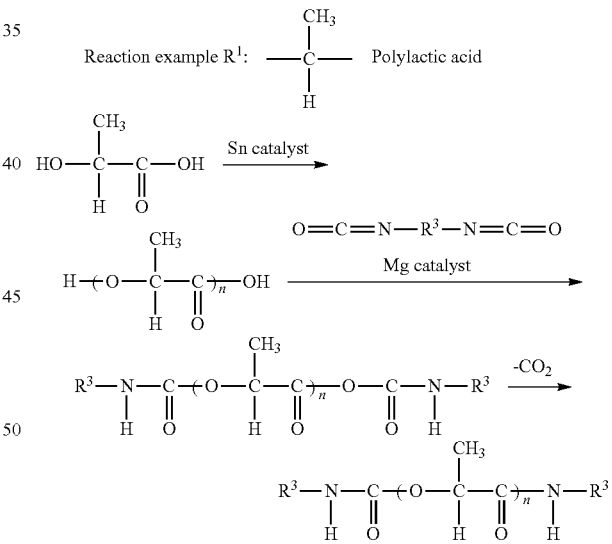

The following scheme shows an exemplary process for producing a polyester resin which contains the structural unit of Formula (3) in a major proportion.

[Chem. 11]

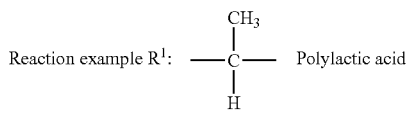

-continued

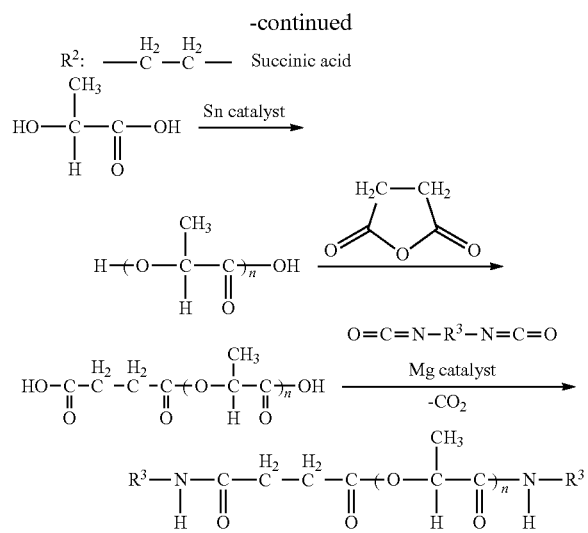

The following scheme shows an exemplary process for producing a polyester resin which contains the structural unit of Formula (4) in a major proportion.

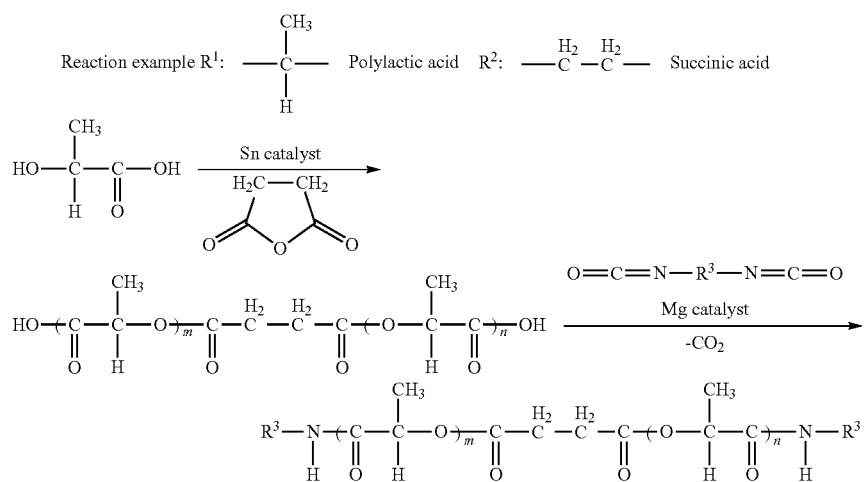

The polyester resins (C) of the invention may be produced by various processes. For example, the aliphatic polyester resin (A) and the polyisocyanate compound (B) may be reacted together in the presence of the amidation catalyst by being extruded in a twin-screw extruder to give a polyester resin (C). There will be described in detail hereinbelow an exemplary reaction process in a twin-screw extruder.

A mixture of the aliphatic polyester resin (A) and the amidation catalyst is placed into a twin-screw extruder. The polyisocyanate compound (B) is fed at some midpoint in the twin-screw extruder, and the aliphatic polyester resin (A) and the polyisocyanate compound (B) are extruded and reacted together to yield a polyester resin (C).

In the twin-screw extruder, the barrel temperature is preferably in the range of 160 to 200° C., more preferably 160 to 190° C., and still more preferably 160 to 180° C. The residence time from the material feeding to the discharging is preferably in the range of 1 to 30 minutes, and more preferably 1 to 10 minutes.

The polyester resins (C) of the invention may be shaped by various shaping methods. For example, the extruded strand may be air-cooled on a belt conveyer and successively cut with a pelletizer into pellets of the polyester resin (C).

Films according to the present invention contain the polyester resin (C). The films may be produced by any known shaping methods without limitation. Exemplary film-shaping methods are T-die extrusion, blown film extrusion, calendering and hot pressing. The films may be stretched at least in one direction. The stretching methods are not particularly limited and include roll stretching, tentering and blow-extrusion.

Shaped articles according to the present invention contain the polyester resin (C). Specific examples of the shaped articles include trays, cups, transparent packages, home appliance housings and automobile parts.

<Uses>

The polyester resins (C) of the invention may be shaped by various shaping methods as described above and may be suitably used in various applications without limitation. For example, the resins of the invention may be used in automobile parts, home appliance parts, electric/electronic parts, building materials, civil engineering materials, agricultural materials, daily commodities, films, and breathable films or sheets. Further, the resins may also be used suitably as foams for general industrial applications or recreation applications. Furthermore, the resins may be used in such applications as yarns, textiles, medical products and sanitary items. In particular, the resins of the invention may be suitably used in automobile parts, home appliance parts and electric/electronic material parts where heat resistance and impact resistance are required. In detail, the automobile parts include general resin-made parts such as front doors and wheel caps. The home appliance parts include housings of products such as personal computers, headphone stereos and cellular phones. The electric/electronic parts include reflecting films or sheets, and polarizing films or sheets.

The polyester resins (C) that contain in a major proportion a structural unit represented by at least one selected from Formulae (2) to (4) are biodegradable and have excellent mechanical properties, and are suitably used in various fields requiring biodegradability.

EXAMPLES

The present invention will be described in greater detail based on examples hereinbelow without limiting the scope of the invention.

In Examples, properties were measured by the following methods.

<Weight Average Molecular Weight (Mw)>

The weight average molecular weight was determined by gel permeation chromatography (GPC, GPC-100 manufactured by SHODEX, columns: LF-G and LF-804 manufactured by SHODEX) (column temperature: 40° C., flow rate: 1 ml/min, chloroform solvent) relative to polystyrene standards.

<Crystallinity>

The crystallinity was determined by DSC (differential scanning calorimeter: RDC 220 manufactured by SII). A 5-6 mg sample was weighed out and was placed in a nitrogen-sealed pan. The pan was then placed in a nitrogen-sealed DSC measurement unit set at 30° C. The temperature was increased to 200° C. at a rate of 10° C./min and was lowered to 10° C. at a rate of 99° C./min. The temperature was again raised to 200° C. at a rate of 10° C./min. The melting enthalpy ($\Delta H_m$) of the crystal in the second temperature increasing was measured, and the crystallinity was obtained from $[(\Delta H_m)/(\Delta H_0)] \times 100$. Here, $\Delta H_0$ is the melting enthalpy of perfect ideal crystal and the value of polylactic acid, 93 J/g, was adopted.

<Melting Point>

The melting point was determined by DSC (differential scanning calorimeter: RDC 220 manufactured by SII). A 5-6 mg sample was weighed out and was placed in a nitrogen-sealed pan. The pan was then placed in a nitrogen-sealed DSC measurement unit set at 30° C. The temperature was increased to 200° C. at a rate of 10° C./min.

<Glass Transition Temperature>

The glass transition temperature was determined by DSC (differential scanning calorimeter: RDC 220 manufactured by SII). A 5-6 mg sample was weighed out and was placed in a nitrogen-sealed pan. The pan was then placed in a nitrogen-sealed DSC measurement unit set at 30° C. The temperature was increased to 200° C. at a rate of 10° C./min.

<Decomposition Temperature>

The decomposition temperature was determined by TG-DTA (differential scanning calorimeter: TG-DTA-320 manufactured by SII). A 5-6 mg sample was weighed out and was placed in an aluminum pan. The pan was then placed in a TG-DTA measurement unit set at 30° C. in a nitrogen atmosphere. The temperature was increased to 500° C. at a rate of 10° C./min.

<Carboxylic Acid Value>

A chloroform/methanol (=7/3) solvent mixture in a volume of 20 ml was added to a polymer sample weighing 0.5 g, and the polymer was completely dissolved therein. Two droplets of an ethanol solution of indicators, bromthymol blue and phenol red, were added to the solution, resulting in a yellow color. The solution was then titrated with a 0.1 N alcoholic potassium hydroxide solution until the yellow color turned a light purple color, and the carboxylic acid value of the polymer was obtained from the endpoint of the titration.

<Terminal Carboxylic Acid Percentage>

A sample from the reaction of polylactic acid and succinic anhydride was analyzed by $^1$H-NMR (apparatus: ECA 500 manufactured by JEOL Ltd., internal standard tetramethylsilane: $\delta=0$ ppm). In the spectrum obtained:

$\delta=2.2$ ppm (multiplet)

Assigned to the methylene chain hydrogens (4H) in succinic acid units that had reacted with the terminals of the polylactic acid.

$\delta=4.5$ ppm (quartet)

Assigned to the methine hydrogen (1H) at the α-position relative to the terminal hydroxyl group in the polylactic acid chain.

$\delta=4.9$ ppm (multiplet)

Assigned to the methine hydrogens (as many H as lactic acid molecules that were polymerized) in the polylactic acid chain.

The number of terminal carboxylic acid groups (=number of carboxyl groups in polylactic acid+number of carboxyl groups in succinic acid substituted at the terminal), and the number of terminal hydroxyl groups (number of terminal hydroxyl groups in unreacted polylactic acid) were obtained from the ratio of the integrated values of the above three peaks. The terminal carboxylic acid percentage was calculated from the equation below:

Terminal carboxylic acid percentage (%)=number of terminal carboxylic acid groups×100/(number of terminal carboxylic acid groups+number of terminal hydroxyl groups)

<Ratio between Urethane Bonds and Amide Bonds in Chain-Extended Polymer>

A sample (a chain-extended polymer) from the reaction of polylactic acid and hexamethylene diisocyanate was analyzed by $^{13}$C-NMR (apparatus: ECA 500 manufactured by JEOL Ltd., internal standard chloroform-d: $\delta=77$ ppm). In the spectrum obtained:

$\delta=39$ ppm:

Assigned to the α-carbon atoms in hexamethylene units adjacent to amide bonds.

$\delta=41$ ppm:

Assigned to the α-carbon atoms in hexamethylene units adjacent to urethane bonds.

The ratio between the urethane bonds and the amide bonds (urethane bonds/amide bonds) in the chain-extended polymer was obtained from the ratio of the integrated values of the above two peaks. The ratio was substantially in agreement with the ratio of the number of terminal hydroxyl groups and the number of terminal carboxylic acid groups in the chain-extended polymer.

Production Example 1

From lactic acid as a material, cyclic lactide (a dimer) was synthesized. The lactide was ring-opening polymerized to give LACEA H400 (available from Mitsui Chemicals, Inc., Mw: 240,000). A 2 L round-bottomed flask was charged with 300 g of LACEA H400 and 600 g of xylene. The flask was then purged with nitrogen, and the materials were heated to 140° C. at normal pressure in the nitrogen atmosphere. Distilled water weighing 30 g was added to the flask with use of a dropping funnel over a period of 5 hours, and the system was held at 140° C. and normal pressure for 30 hours. Thereafter, chloroform was added and precipitation was performed with methanol, resulting in polylactic acid (hereinafter, also PLA) as white powder. The weight average molecular weight of PLA was measured to be 40,000 by the method as described hereinabove. The carboxylic acid value was determined to be $9.09×10^{-5}$ (mol/g) by the method as described above. From the carboxylic acid value, the number average molecular weight Mn was calculated to be 11,000. In the calculation of the number average molecular weight (Mn) of PLA from the carboxylic acid value, it was assumed that the PLA molecule contained one carboxyl group and one hydroxyl group at terminals. In detail, the carboxylic acid value of $9.09×10^{-5}$ (mol/g) indicated that 1 g of PLA consisted of $9.09×10^{-5}$ (mol) of PLA molecules, and accordingly the number average molecular weight Mn was $1/(9.09×10^{-5})=11,000$.

Production Example 2

A 500 ml round-bottomed flask equipped with a Dean-Stark trap was charged with 333.00 g (3.327 mol) of 90% L-lactic acid (lactic acid containing L-isomer at 99.5%) purchased from Purac and 1.82 g of reagent tin (II) chloride dihydrate (manufactured by Wako Pure Chemical Industries, Ltd.). The flask was purged with nitrogen, and the system was heated to 140° C. at normal pressure in the nitrogen atmosphere. When the system had been held at 140° C. and normal pressure in the nitrogen atmosphere for 1 hour, the flask was evacuated and the system was held at 140° C. and 50 mm Hg for 2 hours. Subsequently, the flask was brought to normal pressure and was further charged with 17.02 g of xylene. The Dean-Stark trap was exchanged with a Dean-Stark trap filled with xylene. The flask was thereafter evacuated to 500 mm Hg and the temperature was increased. The system was held at 155° C. and 500 mm Hg for 10 hours, resulting in transparent poly(L-lactic acid) (hereinafter, also PLLA (1)). The weight average molecular weight of PLLA (1) was measured to be 22,000 by the method as described hereinabove. The carboxylic acid value was determined to be $1.25×10^{-4}$ (mol/g) by the method as described above. From the carboxylic acid value, the number average molecular weight Mn was calculated to be 8,000.

Further, 5.992 g of succinic anhydride was added to the flask and the mixture was stirred at 150° C. for 2 hours to produce poly(L-lactic acid) in which a terminal hydroxyl group in PLLA (1) was converted to a carboxyl group (hereinafter, also PLLA (2)). Subsequently, the flask was brought to normal pressure and 160 g of xylene was added for dilution. The resultant solution was withdrawn and the xylene was air dried under a stream of nitrogen. PLLA (2) was washed two times with 0.5 L of 2-propanol containing 1% of 33% hydrochloric acid, was thereafter filtered and was washed with methanol several times, resulting in white PLLA (2). The terminal carboxylic acid percentage of PLLA (2) was determined to be 91% by the method as described hereinabove. The carboxylic acid value of PLLA (2) was determined to be $2.27×10^{-4}$ (mol/g) by the method as described above. From the carboxylic acid value and the terminal carboxylic acid percentage, the number average molecular weight Mn was calculated to be 8,000. The Sn content in PLLA (2) was measured to be not more than 5 ppm.

Production Example 3

A 1000 ml round-bottomed flask was charged with 500.00 g (3.469 mol) of L-lactide purchased from Purac, and the flask was purged with nitrogen. Thereafter, 200 ml of xylene was added, and the mixture was heated to 140° C. at normal pressure in the nitrogen atmosphere. Subsequently, 3.15 g (0.032 mol) of 90% L-lactic acid (lactic acid containing L-isomer at 99.8%) purchased from Purac and successively 0.1300 g (0.32 mmol) of tin octanoate were added. The mixture was held at 140° C. for 2 hours to give transparent poly(L-lactic acid) (hereinafter, also PLLA (3)). The weight average molecular weight of PLLA (3) was measured to be 20,000 by the method as described hereinabove. The carboxylic acid value was determined to be $1.31×10^{-4}$ (mol/g) by the method as described above. From the carboxylic acid value, the number average molecular weight Mn was calculated to be 7,600.

Further, 8.000 g of succinic anhydride was added to the flask and the mixture was stirred at 140° C. for 1 hour to produce poly(L-lactic acid) in which a terminal hydroxyl group in PLLA (3) was converted to a carboxyl group (hereinafter, also PLLA (4)). Subsequently, the flask was brought to normal pressure, and PLLA (4) was transferred on a tray and was solidified. The polymer was then washed with a hydrogen chloride/acetone solution to remove the tin catalyst. PLLA (4) thus obtained weighed 480 g. The carboxylic acid value of PLLA (4) was determined to be $2.68×10^{-4}$ (mol/g) by the method as described above. From the carboxylic acid value, the number average molecular weight Mn was calculated to be 7,500. In the calculation of the number average molecular weight (Mn) of PLLA (4) from the carboxylic acid value, was assumed that the molecule of PLLA (4) had two carboxyl groups at terminals as a result of the conversion of the terminal hydroxyl groups to the carboxyl groups. In detail, the carboxylic acid value of $2.68×10^{-4}$ (mol/g) indicated that 1 g of PLLA (4) consisted of $½×2.68×10^{-4}$ (mol) of PLLA (4) molecules, and accordingly the number average molecular weight Mn was $1/(2.68×10^{-4})×2=7,500$. The Sn content in PLLA (4) was measured to be not more than 5 ppm.

Example 1

A 100 ml round-bottomed flask was charged with 6.00 g ($5.45×10^{-4}$ mol) of PLA from Production Example 1 and 17.02 g of orthodichlorobenzene (hereinafter, also ODCB). The flask was purged with nitrogen, and the temperature was increased to 150° C. at normal pressure in the nitrogen atmosphere. Subsequently, 0.005 g of bis(acetylacetonato)magnesium and 0.005 g of dibutyltin dilaurate were added to the flask, and 0.12 g ($7.13×10^{-4}$ mol) of hexamethylene diisocyanate was further added. Reaction was carried out at 150° C. for 6 hours. Thereafter, chloroform was added, and precipitation was performed with methanol, resulting in a white powdery resin. The resin was analyzed by $^{13}$C-NMR as described hereinabove, and the ratio between the urethane bonds and the amide bonds (urethane bonds/amide bonds) was calculated to be 53/47. The spectrum obtained is shown in FIG. 1. The weight average molecular weight of the resin was determined to be 140,000 by the method described hereinabove. The resin was allowed to stand in the air for one week, and the weight average molecular weight was measured again by the same method. The molecular weight remained the same at 140,000.

The crystallinity, melting point, glass transition temperature and decomposition temperature of the resin were measured by the methods described hereinabove, the results being set forth in Table 1.

Example 2

A white powdery resin was obtained in the same manner as in Example 1, except that bis(acetylacetonato)magnesium was changed to magnesium stearate. The weight average molecular weight of the resin was determined to be 130,000 by the method described hereinabove. The resin was allowed to stand in the air for one week, and the weight average molecular weight was measured again by the same method. The molecular weight remained the same at 130,000.

The crystallinity, melting point, glass transition temperature and decomposition temperature of the resin were measured by the methods described hereinabove, the results being set forth in Table 1.

Example 3

A white powdery resin was obtained in the same manner as in Example 1, except that bis(acetylacetonato)magnesium was changed to calcium stearate. The weight average molecular weight of the resin was determined to be 130,000 by the method described hereinabove. The resin was allowed to stand in the air for one week, and the weight average molecular weight was measured again by the same method. The molecular weight remained the same at 130,000.

The crystallinity, melting point, glass transition temperature and decomposition temperature of the resin were measured by the methods described hereinabove, the results being set forth in Table 1.

Example 4

A 100 ml round-bottomed flask was charged with 6.00 g ($5.45 \times 10^{-4}$ mol) of PLA from Production Example 1 and 17.02 g of orthodichlorobenzene (hereinafter, also ODCB). The flask was purged with nitrogen, and the temperature was increased to 150° C. at normal pressure in the nitrogen atmosphere. Subsequently, 0.20 g of succinic anhydride was added to the flask, and reaction was performed at 150° C. for 5 hours to convert a terminal hydroxyl group of PLA to a carboxyl group. Thereafter, 0.005 g of bis(acetylacetonato)magnesium and 0.005 g of dibutyltin dilaurate were added to the flask, and 0.12 g ($7.13 \times 10^{-4}$ mol) of hexamethylene diisocyanate was further added. Reaction was carried out at 150° C. for 4 hours. Thereafter, chloroform was added, and precipitation was performed with methanol, resulting in a white powdery resin. The weight average molecular weight of the resin was determined to be 100,000 by the method described hereinabove. The resin was allowed to stand in the air for one week, and the weight average molecular weight was measured again by the same method. The molecular weight remained the same at 100,000.

The crystallinity, melting point, glass transition temperature and decomposition temperature of the resin were measured by the methods described hereinabove, the results being set forth in Table 1.

Example 5

A 500 ml round-bottomed flask equipped with a Dean-Stark trap was charged with 333.00 g (3.327 mol) of 90% L-lactic acid (lactic acid containing L-isomer at 99.9%) purchased from Purac and 0.137 g of reagent tin (II) chloride dihydrate (manufactured by Wako Pure Chemical Industries, Ltd.). The flask was purged with nitrogen, and the system was heated to 140° C. at normal pressure in the nitrogen atmosphere. When the system had been held at 140° C. and normal pressure in the nitrogen atmosphere for 1 hour, the flask was evacuated and the system was held at 140° C. and 50 mm Hg for 2 hours. Subsequently, the flask was brought to normal pressure and was further charged with 17.02 g of ODCB. The Dean-Stark trap was exchanged with a Dean-Stark trap which was filled with ODCB containing 30 g of molecular sieve 3A (manufactured by Wako Pure Chemical Industries, Ltd.). The flask was thereafter evacuated to 10 mm Hg and the temperature was increased. The system was held at 160° C. and 10 mm Hg for 17 hours, resulting in transparent poly(L-lactic acid) (hereinafter, also PLLA). The weight average molecular weight of PLLA was measured to be 23,000 by the method as described hereinabove. The carboxylic acid value was determined to be $1.50 \times 10^{-4}$ (mol/g) by the method as described above. From the carboxylic acid value, the number average molecular weight Mn was calculated to be 6,700.

The flask was brought to normal pressure and the temperature was lowered to 150° C. Thereafter, 260 g of ODCB, 0.050 g of bis(acetylacetonato)magnesium and 0.050 g of dibutyltin dilaurate were successively added to PLLA ($3.58 \times 10^{-2}$ mol). Further, 7.00 g ($4.16 \times 10^{-2}$ mol) of hexamethylene diisocyanate was added to the flask. Reaction was carried out at 150° C. for 4 hours. Thereafter, chloroform was added, and precipitation was performed with methanol, resulting in a white powdery resin. The weight average molecular weight of the resin was determined to be 140,000 by the method described hereinabove. The resin was allowed to stand in the air for one week, and the weight average molecular weight was measured again by the same method. The molecular weight remained the same at 140,000.

The crystallinity, melting point, glass transition temperature and decomposition temperature of the resin were measured by the methods described hereinabove, the results being set forth in Table 1.

Example 6

Transparent PLLA was prepared in the same manner as in Example 5. The weight average molecular weight of PLLA was determined to be 20,400 by the method described hereinabove. To the flask, 4.000 g of succinic anhydride was added, and the mixture was stirred at 150° C. for 4 hours to convert a terminal hydroxyl group of PLLA to a carboxyl group. The carboxylic acid value of PLLA was measured by the aforementioned method to be $3.17 \times 10^{-4}$ (mol/g). From the carboxylic acid value, the number average molecular weight Mn was calculated to be 6,300. In the calculation of the number average molecular weight (Mn) of PLLA from the carboxylic acid value, it was assumed that the molecule of PLLA had two carboxyl groups at terminals as a result of the conversion of the terminal hydroxyl groups to the carboxyl groups. In detail, the carboxylic acid value of $3.17 \times 10^{-4}$ (mol/g) indicated that 1 g of PLLA consisted of $\frac{1}{2} \times 3.17 \times 10^{-4}$ (mol) of PLLA molecules, and accordingly the number average molecular weight Mn was $1/(3.17 \times 10^{-4}) \times 2 = 6,300$.

The flask was brought to normal pressure and the temperature was lowered to 150° C. Thereafter, 260 g of ODCB and 0.050 g of bis(acetylacetonato)magnesium were successively added to PLLA ($3.81 \times 10^{-2}$ mol). Further, 7.00 g ($4.16 \times 10^{-2}$ mol) of hexamethylene diisocyanate was added to the flask. Reaction was carried out at 150° C. for 4 hours. Thereafter, chloroform was added, and precipitation was performed with methanol, resulting in a white powdery resin. The weight average molecular weight of the resin was determined to be 130,000 by the method described hereinabove. The resin was allowed to stand in the air for one week, and the weight average molecular weight was measured again by the same method. The molecular weight remained the same at 130,000.

The crystallinity, melting point, glass transition temperature and decomposition temperature of the resin were measured by the methods described hereinabove, the results being set forth in Table 1.

Example 7

A 50 ml round-bottomed flask was charged with 15.00 g ($1.87 \times 10^{-3}$ mol) of PLLA (2) from Production Example 2, 0.0038 g of bis(acetylacetonato)magnesium and 5.22 g of xylene. The flask was purged with nitrogen, and the temperature was increased to 160° C. at normal pressure in the nitrogen atmosphere. Subsequently, 0.43 g ($2.6 \times 10^{-3}$ mol, 1.3 equivalents) of hexamethylene diisocyanate was added. Reaction was carried out at 160° C. for 1 hour. Thereafter, xylene was added, and the product was crystallized, filtered and washed with methanol to give a white powdery resin. The resin was analyzed by $^{13}$C-NMR as described hereinabove, and the ratio between the urethane bonds and the amide bonds (urethane bonds/amide bonds) was calculated to be 9/91. The proportion of the amide bonds was in agreement with the terminal carboxylic acid percentage 91% of PLLA (2) synthesized in Production Example 2.

The weight average molecular weight of the resin was determined to be 200,000 by the method described hereinabove. The resin had a crystallinity of 15%, a melting point of 153° C., a glass transition temperature of 60° C., and a 5% weight reduction temperature of 310° C.

Example 8

A white powdery resin was obtained in the same manner as in Example 7, except that bis(acetylacetonato)magnesium was changed to magnesium chloride. The weight average molecular weight of the resin was determined to be 259,000 by the method described hereinabove. The resin had a crystallinity of 15%, a melting point of 153° C., a glass transition temperature of 60° C., and a 5% weight reduction temperature of 306° C.

Example 9

A white powdery resin was obtained in the same manner as in Example 7, except that bis(acetylacetonato)magnesium was changed to ytterbium triflate. The weight average molecular weight of the resin was determined to be 180,000 by the method described hereinabove.

Example 10

A mixture of 100 parts by weight of PLLA (2)' ($1.79 \times 10^{-4}$ mol/g) produced as described in Production Example 2 and 0.24 part by weight of magnesium stearate was fed at 1 kg/h to a twin-screw segment extruder (2D30W2 manufactured by TOYO SEIKI SEISAKU-SHO, LTD., inner diameter: 25 mm, L/D: 40) connected with Labo Plastomill (4C150-01 manufactured by TOYO SEIKI SEISAKU-SHO, LTD.) Hexamethylene diisocyanate was fed at some midpoint in the extruder at 0.6 ml/min, and PLLA (2)' and the hexamethylene diisocyanate were extruded and reacted together. The screw rotation was 140 rpm, the barrel temperature was 180° C., and the residence time from the material feeding to the discharging was 12 minutes. The extruded strand was air-cooled on a belt conveyer and was successively cut with a pelletizer into pellets. The weight average molecular weight of the pellets was determined to be 200,000 by the method described hereinabove. The melting point and the crystallization temperature were determined to be 155° C. and 115° C., respectively, by the methods described hereinabove. The pellets were preheated at 180° C. for 5 minutes and were hot pressed at 10 MPa for 5 minutes to give a 100 μm thick film. The tensile strength and elongation of the film were measured to be 74 MPa and 5%.

Example 11

A round-bottomed flask was charged with 30 g ($5.36 \times 10^{-3}$ mol) of PLLA (2)' produced as described in Production Example 2, 12 g of xylene and 0.0012 g of bis (acetylacetonato)magnesium. Further, 0.9018 g ($5.36 \times 10^{-3}$ mol) of hexamethylene diisocyanate was added to the flask. Reaction was carried out at 130° C. for 3 hours. Thereafter, chloroform was added, and precipitation was performed with methanol, resulting in a white powdery resin. The resin was analyzed by $^{13}$C-NMR as described hereinabove and was confirmed to contain amide bonds. The weight average molecular weight of the resin was determined to be 185,000 by the method described hereinabove. The resin was allowed to stand in the air for one week, and the weight average molecular weight was measured again by the same method. The molecular weight remained the same at 185,000.

Example 12

A white powdery resin was obtained in the same manner as in Example 11, except that 0.9018 g ($5.36 \times 10^{-3}$ mol) of hexamethylene diisocyanate was replaced by 1.0308 g ($6.13 \times 10^{-3}$ mol) of 1,3-xylylene diisocyanate. The resin was analyzed by $^{13}$C-NMR as described hereinabove and was confirmed to contain amide bonds. The weight average molecular weight of the resin was determined to be 280,000 by the method described hereinabove. The resin was allowed to stand in the air for one week, and the weight average molecular weight was measured again by the same method. The molecular weight remained the same at 280,000.

Example 13

A white powdery resin was obtained in the same manner as in Example 11, except that 0.9018 g ($5.36 \times 10^{-3}$ mol) of hexamethylene diisocyanate was replaced by 1.0357 g ($5.33 \times 10^{-3}$ mol) of 1,3-bis(isocyanatomethyl)cyclohexane. The resin was analyzed by $^{13}$C-NMR as described hereinabove and was confirmed to contain amide bonds. The weight average molecular weight of the resin was determined to be 280,000 by the method described hereinabove. The resin was allowed to stand in the air for one week, and the weight average molecular weight was measured again by the same method. The molecular weight remained the same at 280,000.

Example 14

A white powdery resin was obtained in the same manner as in Example 11, except that 0.9018 g ($5.36 \times 10^{-3}$ mol) of hexamethylene diisocyanate was replaced by 1.0297 g ($5.30 \times 10^{-3}$ mol) of 1,4-bis(isocyanatomethyl)cyclohexane. The resin was analyzed by $^{13}$C-NMR as described hereinabove and was confirmed to contain amide bonds. The weight average molecular weight of the resin was determined to be 160,000 by the method described hereinabove. The resin was allowed to stand in the air for one week, and the weight average molecular weight was measured again by the same method. The molecular weight remained the same at 160,000.

Example 15

A white powdery resin was obtained in the same manner as in Example 11, except that 0.9018 g ($5.36 \times 10^{-3}$ mol) of hexamethylene diisocyanate was replaced by 1.4117 g ($5.38 \times 10^{-3}$ mol) of bis(4-isocyanatocyclohexyl)methane. The resin was analyzed by $^{13}$C-NMR as described hereinabove and was confirmed to contain amide bonds. The weight average molecular weight of the resin was determined to be 80,000 by the method described hereinabove. The resin was allowed to stand in the air for one week, and the weight average molecular weight was measured again by the same method. The molecular weight remained the same at 80,000.

Example 16

A white powdery resin was obtained in the same manner as in Example 11, except that 0.9018 g ($5.36 \times 10^{-3}$ mol) of hexamethylene diisocyanate was replaced by 1.1058 g ($5.36 \times 10^{-3}$ mol) of bis(isocyanatomethyl)bicyclo-[2,2,1]-heptane. The resin was analyzed by $^{13}$C-NMR as described hereinabove and was confirmed to contain amide bonds. The weight average molecular weight of the resin was determined to be 140,000 by the method described hereinabove. The resin was allowed to stand in the air for one week, and the weight average molecular weight was measured again by the same method. The molecular weight remained the same at 140,000.

Example 17

A round-bottomed flask was charged with 30 g ($3.95 \times 10^{-3}$ mol) of PLLA (4) from Production Example 3, 12 g of xylene and 0.0012 g of bis(acetylacetonato)magnesium. Further, 0.7651 g ($4.55 \times 10^{-3}$ mol) of hexamethylene diisocyanate was added to the flask. Reaction was carried out at 130° C. for 3 hours. Thereafter, chloroform was added, and precipitation was performed with methanol, resulting in a white powdery resin. The resin was analyzed by $^{13}$C-NMR as described hereinabove and was confirmed to contain amide bonds. The weight average molecular weight of the resin was determined to be 330,000 by the method described hereinabove. The resin was allowed to stand in the air for one week, and the weight average molecular weight was measured again by the same method. The molecular weight remained the same at 330,000.

Comparative Example 1

A white powdery resin was obtained in the same manner as in Example 1, except that bis(acetylacetonato)magnesium was not used. The weight average molecular weight of the resin was determined to be 150,000 by the method described hereinabove. The resin was allowed to stand in the air for one week, and the weight average molecular weight was measured again by the same method. The molecular weight had lowered to 80,000.

The crystallinity, melting point, glass transition temperature and decomposition temperature of the resin were measured by the methods described hereinabove, the results being set forth in Table 1.

The invention claimed is:

1. A polyester resin (C) which is obtained by reacting an aliphatic polyester resin (A) and a polyisocyanate compound (B) in the presence of an amidation catalyst and comprises a structural unit represented by Formula (1) below and in a major proportion a structural unit represented by at least one selected from Formulae (3) and (4) below:

[Chem. 1]

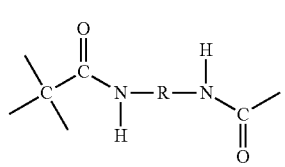
(1)

wherein R is a C1-20 aliphatic hydrocarbon group, an alicyclic structure-containing hydrocarbon group or an aromatic ring-containing hydrocarbon group;

[Chem. 3]

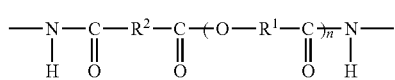
(3)

wherein $R^1$ each independently represent a substituted or unsubstituted C1-20 aliphatic hydrocarbon group, $R^2$ represents a substituted or unsubstituted C1-20 aliphatic hydrocarbon group, a C2-20 unsaturated hydrocarbon group or an aromatic hydrocarbon group, and n is an integer ranging from 20 to 1500;

[Chem. 4]

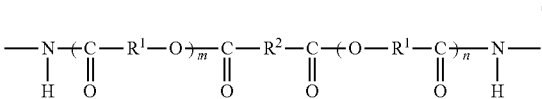
(4)

wherein $R^1$ each independently represent a substituted or unsubstituted C1-20 aliphatic hydrocarbon group, $R^2$ represents a substituted or unsubstituted C1-20 aliphatic

TABLE 1

|  | Amount |  |  | Resin (C) |  |  |  |  |  |  |
|---|---|---|---|---|---|---|---|---|---|---|
|  |  | (equivalents) of isocyanate | Metals contained |  |  |  |  |  | Decomposition temperature (° C.) | |
|  | Mw of resin (A) | (B) to resin (A) | in catalyst | Mw | Mw after 1 week | Tg (° C.) | Tm (° C.) | Crystallinity (%) | 1% | 5% |
| Ex. 1 | 40000 | 1.31 | Mg, Sn | 140000 | 140000 | 54 | 159 | 25 | 238 | 251 |
| Ex. 2 | 40000 | 1.31 | Mg, Sn | 130000 | 130000 | 54 | 159 | 25 | 240 | 256 |
| Ex. 3 | 40000 | 1.31 | Ca, Sn | 130000 | 130000 | 54 | 160 | 25 | 238 | 256 |
| Ex. 4 | 40000 | 1.31 | Mg, Sn | 100000 | 100000 | 54 | 161 | 15 | 238 | 251 |
| Ex. 5 | 23000 | 1.19 | Mg, Sn | 140000 | 140000 | 54 | 159 | 18 | 242 | 256 |
| Ex. 6 | 20400 | 1.09 | Mg | 130000 | 130000 | 54 | 159 | 26 | 250 | 270 |
| Comp. Ex. 1 | 40000 | 1.31 | Sn | 150000 | 80000 | 54 | 158 | 15 | 240 | 250 | hydrocarbon group, a C2-20 unsaturated hydrocarbon group or an aromatic hydrocarbon group, and n and m are each independently an integer ranging from 20 to 1500.

2. The polyester resin (C) according to claim 1, wherein the aliphatic polyester resin (A) is obtained from a hydroxycarboxylic acid.

3. The polyester resin (C) according to claim 1, wherein the aliphatic polyester resin (A) is polylactic acid.

4. The polyester resin (C) according to claim 3, wherein the polylactic acid is obtained from lactic acid, and the content of L-isomer or D-isomer in the lactic acid is not less than 90%.

5. The polyester resin (C) according to claim 1, which has a crystallinity in the range of 10 to 70%.

6. The polyester resin (C) according to claim 1, wherein the polyisocyanate compound (B) is an aliphatic diisocyanate compound.

7. The polyester resin (C) according to claim 1, wherein the polyisocyanate compound (B) is a compound selected from the group consisting of hexamethylene diisocyanate, isophorone diisocyanate, 1,3-(bis-isocyanatomethyl) cyclohexane, bis(isocyanatomethyl)bicyclo-[2,2,1]-heptane and bis(4-isocyanatocyclohexyl) methane.

8. The polyester resin (C) according to claim 1, which has a weight average molecular weight in the range of 100,000 to 1,000,000.

9. The polyester resin (C) according to claim 1, wherein the weight average molecular weight of the aliphatic polyester resin (A) is in the range of 5,000 to 100,000 and
the weight average molecular weight of the polyester resin (C) obtained is in the range of 100,000 to 1,000,000 and is 3 to 200 times larger than the weight average molecular weight of the aliphatic polyester resin (A).

10. A process for producing the polyester resin (C) described in claim 1, which process comprises a step of reacting an aliphatic polyester resin (A) and a polyisocyanate compound (B) in the presence of an amidation catalyst.

11. The process for producing the polyester resin (C) according to claim 10, wherein the polyisocyanate compound (B) is a diisocyanate compound.

12. The process for producing the polyester resin (C) according to claim 10, wherein the aliphatic polyester resin (A) is an aliphatic polyester resin in which a terminal hydroxyl group has been converted to a carboxyl group.

13. The process for producing the polyester resin (C) according to claim 10, wherein the polyisocyanate compound (B) is added in a molar amount that is 0.8 to 2.0 times the moles of the aliphatic polyester resin (A).

14. The process for producing the polyester resin (C) according to claim 10, wherein the aliphatic polyester resin (A) has a weight average molecular weight in the range of 5,000 to 100,000.

15. The process for producing the polyester resin (C) according to claim 10, wherein the aliphatic polyester resin (A) has a Sn content of not more than 300 ppm.

16. The process for producing the polyester resin (C) according to claim 10, wherein the amidation catalyst contains at least one metal selected from the Group I, II and III metals of the periodic table.

17. The process for producing the polyester resin (C) according to claim 10, wherein the amidation catalyst contains magnesium or calcium.

18. The process for producing the polyester resin (C) according to claim 10, wherein the reaction is carried out in a twin-screw extruder.

19. A film comprising the polyester resin (C) described in claim 1.

20. A shaped article comprising the polyester resin (C) described in claim 1.

21. The polyester resin (C) according to claim 1, wherein the aliphatic polyester resin (A) is an aliphatic polyester resin in which a terminal hydroxyl group has been converted to a carboxyl group.

22. The polyester resin (C) according to claim 1, the polyester resin contains the structural units represented by at least one selected from the Formulae (3) and (4) in a proportion of not less than 60 wt %.

* * * * *